No. 641,426. Patented Jan. 16, 1900.
A. M. ALLEN.
TRICYCLE.
(Application filed June 16, 1897.)
(No Model.) 2 Sheets—Sheet 1.

No. 641,426. Patented Jan. 16, 1900.
A. M. ALLEN.
TRICYCLE.
(Application filed June 16, 1897.)
(No Model.) 2 Sheets—Sheet 2.

Witnesses.
R. A. Balderson.
Chas. H. Baker.

Inventor.
Arthur M. Allen.

UNITED STATES PATENT OFFICE.

ARTHUR M. ALLEN, OF NEW YORK, N. Y.

TRICYCLE.

SPECIFICATION forming part of Letters Patent No. 641,426, dated January 16, 1900.

Application filed June 16, 1897. Serial No. 641,062. (No model.)

*To all whom it may concern:*

Be it known that I, ARTHUR M. ALLEN, a citizen of the United States, and a resident of New York, (West New Brighton,) Richmond county, New York, have invented a new and useful Improvement in Tricycles, of which the following is a specification.

This invention relates to improvements in tricycles and provides means to support both ends of the crank-pins by arranging them inside of the frame; also, a fusee and clutch connection on the axle for more power at the beginning of each stroke, and to a method of steering two road-wheels fixed on one axle by brakes applied to the ground to lift the wheel on the inside of the curve and retard that side of the vehicle while the other wheel travels around the curve. It is arranged for four riders, all propelling one axle with two road-wheels fixed rigidly thereon. A caster-wheel in front keeps the vehicle level. I attain these objects by the mechanism illustrated in the accompanying drawings, in which—

Figure 1:
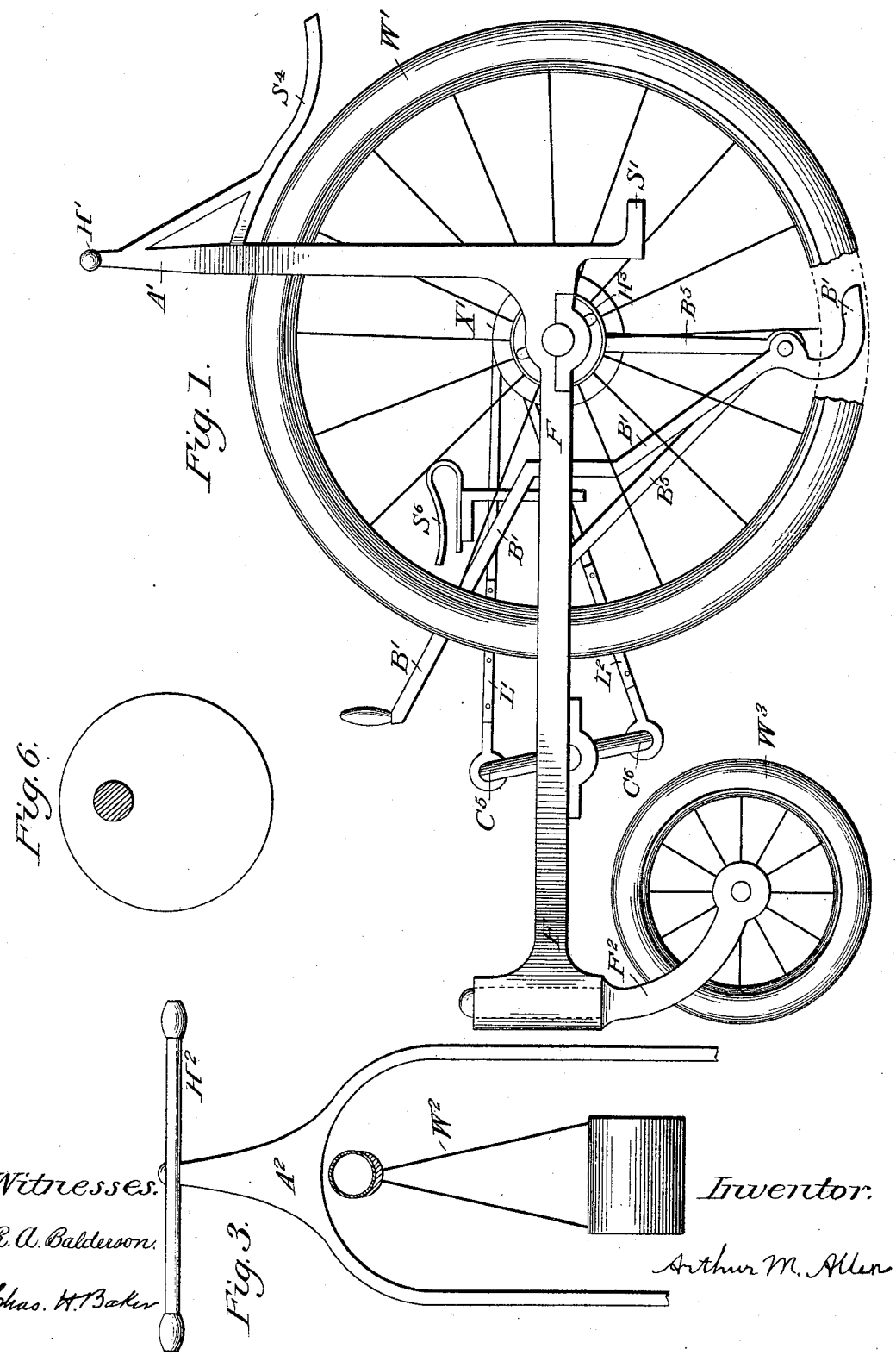
Figure 2:
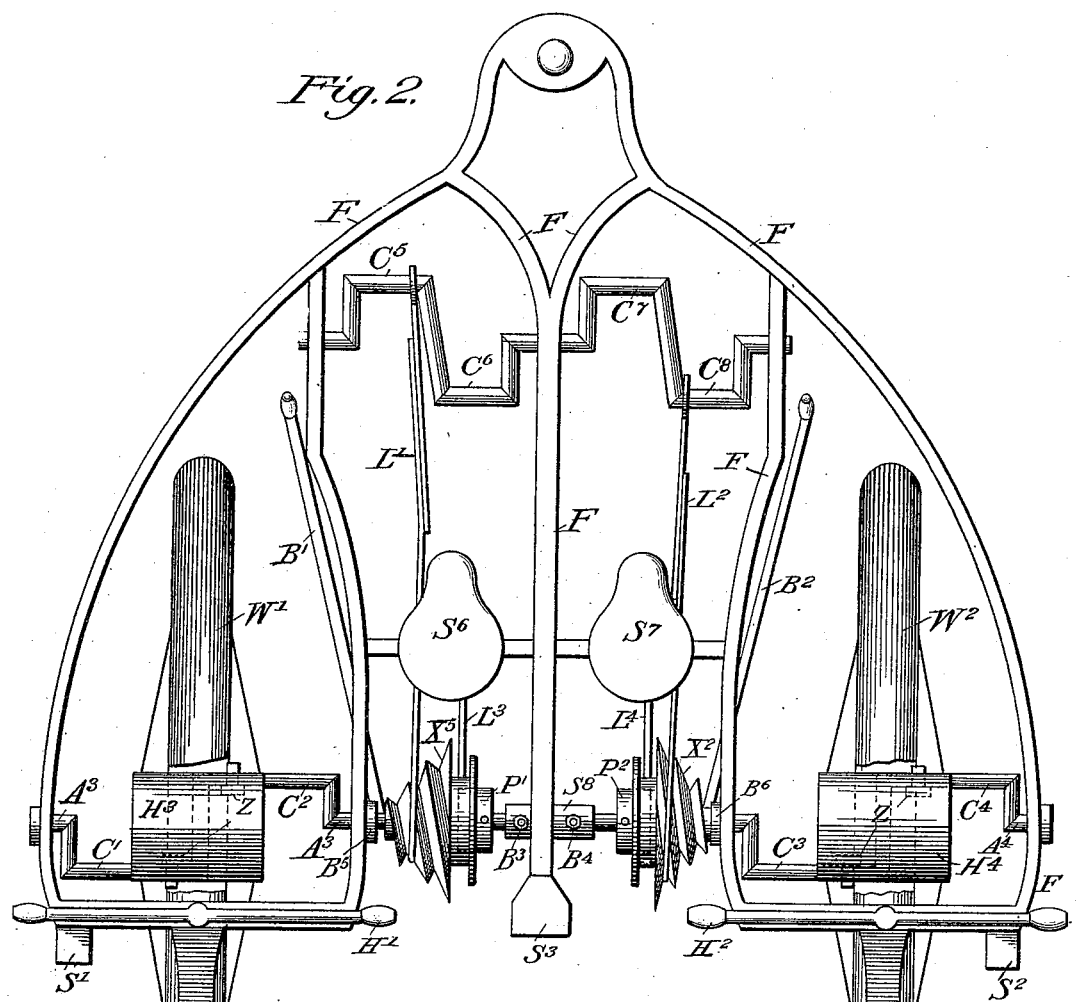
Figure 4:
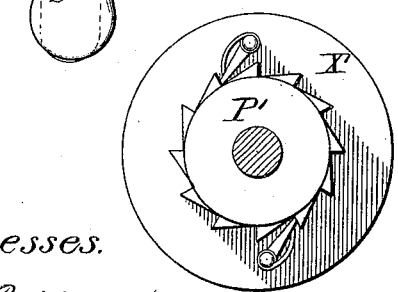
Figure 5:
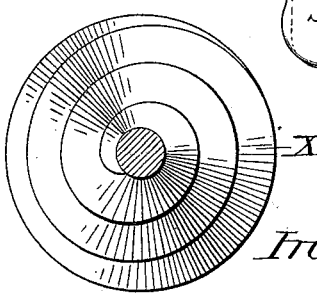

Figure 1 is a side elevation of the vehicle. Fig. 2 is a plan except the caster-wheel. Fig. 3 is a back elevation of one arch and wheel. Fig. 4 shows a ratchet connection between the loose fusee-wheel and fixed pulley; Fig. 5, a side view of fusee-wheel, showing spiral; Fig. 6, a side view of eccentric wheel, sometimes suitable instead of fusee.

Above and behind each road-wheel is an arch of the frame, wide enough for the feet to be used between the wheel and frame sides, and a seat and handle-bar attached. These road-wheels have large barrel-hubs, and each axle is bent with double opposite cranks, parts of which are secured close to the insides of the hubs, and the other parts serve as pedal-crank pins, while the axle ends are mounted in the frame. Each axle, after bending and truing up, is slipped into its wheel-hub and secured by clips. The axle-bearings are in halves, to receive the axles and wheels sidewise, and the axles are then united by a sleeve and bolts.

Two steps for the hind riders are arranged on the frame and another between for the two front riders, who must mount first and reach their seats, arranged forward in the frame, and their four foot-cranks beyond, which are rigidly connected to each other.

On each axle, between the back wheels, is a tight and loose pulley with a clutch or ratchet connection, the loose one with a spiral groove or fusee on its outer surface and operated by a strap connected to one of the forward cranks, to provide increased speed as the leg straightens, and reversed by a spring. Both riders' power is applied to each spiral alternately, and by changing the strap's length the larger or smaller part of the spiral is used and the gear of the vehicle changed. A hand-lever on each side of the front seats is hinged to an extension below the side frame, and by pulling it the road-brake bears on the ground enough to clear the wheel, when the other wheel uses the brake for a center and describes the curve. When both brakes are applied, the vehicle quickly and safely stops without wear on the tires.

In the drawings frame F is supported by hind wheels W' W² and caster-wheel W³ with its frame F². (See Fig. 1.) Axles A³ A⁴, united by sleeve S³ and bolts B³ B⁴, are arranged in frame F, and each bent with double cranks C' C² C³ C⁴. (See Fig. 2.) The wheel-hubs H³ H⁴ are mounted on the middle parts of these cranks and secured by clips 2. Arches A' A² (see Figs. 3 and 1) are parts of the back frame, and handles H' H² and seats S⁴ S⁵ and steps S' S³ are attached thereto, the hind riders operating cranks C' C² C³ C⁴ with their feet close to the hubs and having a bearing on each side of the pedal and avoiding all twist of the cranks.

The fixed pulleys P' P² and spiral loose pulleys X' X² are mounted on the axle near the sleeve S³, (see Fig. 2,) and the straps L' L², with metallic eyes in their crank ends, connect them to the forward cranks C⁵ C⁶ C⁷ C⁸, operated by riders using seats S⁶ S⁷ after mounting step S². These straps L' L² may be lengthened or shortened by an ordinary skate-buckle or suspender-clamp and by using the larger or smaller part of the spiral vary the gear of the vehicle.

Brakes B' B², (see Figs. 1 and 2,) pivoted on supports B⁵ B⁶, when used singly, steer the vehicle by lifting one wheel clear and retarding that side of the machine, while the other wheel keeps its road-grip and describes the curve. When both are used, the vehicle stops without jar. They may be arranged to be operated by foot.

What I claim as new, and desire to secure by Letters Patent, is—

1. The frame F arches $A'$, $A^2$, road-wheels $W'$ $W^2$, provided with cranks $C'$, $C^2$, $C^3$, $C^4$, each arranged between one side of its road-wheel and the inside of its arch, hind seats $S^4$, $S^5$, and axles $A^3$ $A^4$, all in combination with front seats $S^6$, $S^7$, caster road-wheel $W^3$, and a driving connection to said axles.

2. In a wheeled vehicle, an axle bent in six places as shown, its central parts secured in the tubular hub of a road-wheel by clips, the two next parts serving for cranks, and the two ends being in line, and resting in bearings, in the ends of an arched frame, which thereby is supported on the road-wheel.

3. In a wheeled vehicle, two road-wheels rigidly fixed on one axle, in combination with a wheel-frame, and one road-brake mounted on each side of said frame, close to each wheel, whereby either or both wheels may be lifted clear from the ground.

In testimony that I claim the foregoing as my invention I have signed my name, in presence of two witnesses, this 27th day of May, 1897.

ARTHUR M. ALLEN.

Witnesses:
ROBERT SCHALKENBACH,
JAMES WEIR.